United States Patent
Grichnik (12)

(10) Patent No.: US 6,236,950 B1
(45) Date of Patent: May 22, 2001

(54) AUTOMATIC STENCIL GENERATION SYSTEM AND METHOD

(75) Inventor: Anthony J. Grichnik, Peoria, IL (US)

(73) Assignee: Caterpiller Inc., Peoria, IL (US)

( * ) Notice: Subject to any disclaimer, the term of this patent is extended or adjusted under 35 U.S.C. 154(b) by 0 days.

(21) Appl. No.: 09/183,622

(22) Filed: Oct. 30, 1998

(51) Int. Cl.$^7$ ............................ G06F 19/00; G01R 23/00
(52) U.S. Cl. ............................ 702/66; 702/56; 702/76; 702/183; 73/602; 73/659
(58) Field of Search .......................... 702/56, 66, 75–77, 702/183; 73/659–660, 602; 324/76.19, 76.21, 76.22, 772

(56) References Cited

U.S. PATENT DOCUMENTS

| | | | |
|---|---|---|---|
| 4,319,329 | * | 3/1982 | Girgis et al. ............................ 702/75 |
| 4,425,798 | | 1/1984 | Nagai et al. ............................ 73/659 |
| 4,429,578 | | 2/1984 | Darrel et al. ............................ 73/659 |
| 4,680,708 | | 7/1987 | Ambos et al. ......................... 364/417 |
| 4,839,582 | * | 6/1989 | Fukaya et al. ....................... 324/76.19 |
| 4,901,009 | | 2/1990 | Schultze et al. .................. 324/121 R |
| 4,965,513 | * | 10/1990 | Haynes et al. ........................ 324/772 |
| 4,980,844 | * | 12/1990 | Demjanenko et al. ................. 702/56 |
| 5,610,339 | * | 3/1997 | Haseley et al. ........................ 73/659 |
| 5,646,350 | * | 7/1997 | Robinson et al. ...................... 73/602 |
| 5,698,788 | | 12/1997 | Mol et al. ............................... 73/659 |
| 5,739,698 | | 4/1998 | Bowers et al. . |
| 5,922,963 | * | 7/1999 | Piety et al. ............................ 702/183 |

FOREIGN PATENT DOCUMENTS

| | | |
|---|---|---|
| 295 13 754 U 1 | 10/1995 | (DE) . |
| 0 240 329 A2 | 10/1987 | (EP) . |
| 0 572 767 A2 | 12/1993 | (EP) . |
| 2 320 328 | 6/1998 | (GB) . |

OTHER PUBLICATIONS

ISA Transactions U.S. Instrument Soc of Philadephia—On–line Condition Monitoring of Rotating Equipment Using Neural Networks—J.P. Peck, J. Burrows.

Article from Journal of Modern Optics 1996, vol. 43, No. 4,735–751 Temporal evolution of the spectrum emitted by a two–level atom in . . . .

Article J. Phys B: At Mol Opt Phys 29 (1996) 3277–3292 Printed U.K. Wavelet temporal profile of high–order harmonics emitted by a two . . . .

Article Journal of Computational and Applied Mathematics 61 (1995) 275–321 Application of generalized wavelets: An adaptive multiresolution.

Article Pergamon 0895–7177 (94) E0004–7 Galerkin–Wavelet Modeling of Wave Propagation: Optimal Finite–Difference Stencil Design (pp. 31–38).

Article: Measuring ultrashort laser pulses in the time–frequency dom ain using frequency–resolved optical gating Trefino, DeLong, Fittingh. (pp. 3277–3295).

* cited by examiner

Primary Examiner—Marc S. Hoff
Assistant Examiner—Bryan Bui
(74) Attorney, Agent, or Firm—Maginot, Addison & Moore

(57) ABSTRACT

A stencil generator for automatically constructing a stencil representative of signals having similar characteristics includes a boundary extractor and a component generator. The boundary extractor is operable to (i) receive a frequency spectrum of a signal, and (ii) obtain from the received frequency spectrum a plurality of characteristic frequency boundaries for the signal. The component generator is coupled to the boundary extractor and is operable to (i) receive the frequency spectrum, (ii) receive the plurality of characteristic frequency boundaries from the boundary extractor, and (iii) define a plurality of stencil components based upon the plurality of characteristic frequency boundaries and the frequency spectrum.

20 Claims, 7 Drawing Sheets

AUTOMATIC STENCIL GENERATION SYSTEM AND METHOD

TECHNICAL FIELD OF THE INVENTION

The present invention relates generally to signal processing and, more particularly to automatic generation of a stencil representative of signals having similar characteristics.

BACKGROUND OF THE INVENTION

In many different environments, signals may be monitored and analyzed to obtain information about the source of the signal. For example in one environment, electrodes of an electrocardiogram system may be positioned on a patient's body to sense and amplify electrocardiographic (ECG) signals originating from the patient's heart. The signal analyzer may then analyze the sensed and amplified ECG signals to obtain information about the condition of the patient's heart. In another environment, a vibration sensor may be positioned upon an operating automotive transmission to generate vibration signals that are indicative of the mechanical vibrations the transmission is experiencing during operation. A testing apparatus may then monitor and analyze the vibration signals generated by the operating transmission to determine whether the transmission has a mechanical defect.

One technique for analyzing the above signals has been to compare the frequency spectrum of the monitored signals to patterns or stencils that have been obtained from known signal sources. For example, several frequency spectra may be obtained from vibration signals generated by several properly operating transmissions. A technician may then analyze the obtained spectra and define a pattern or stencil which matches the obtained spectra. A testing apparatus then may monitor and compare the vibration signals generated by another transmission to the previously defined stencil in order to determine whether the monitored transmission is functioning correctly.

Similarly, several frequency spectra may be obtained from vibration signals generated by differential assemblies having a defective bearing. Again, a technician may analyze the obtained spectra and define a stencil which matches the obtained spectra. A testing apparatus then may monitor and compare the vibrations signals generated by another differential assembly to the previously defined stencil in order to determine whether the differential assembly has a defective bearing.

A disadvantage of the above signal analysis technique is that defining stencils is costly since a technician must analyze and manually define a stencil representative of signals having a known characteristic (e.g. proper functionality, defective bearing). As should be appreciated, analysis of the generated spectra by the technician is time consuming. Moreover, the time consuming analysis is amplified due to several stencils needing to be defined in order to monitor several types of components, and detect several types of conditions.

Another disadvantage of the above signal analysis technique is that the quality of the defined stencils is highly dependant upon the skill level of the technician defining the stencils. For example, if the technician defines a stencil too strictly, then a testing apparatus may fail to match a monitored signal to the defined signal even though the monitored signal was generated by a device having the condition represented by the defined stencil. Conversely, if the technician defines the stencil too broadly, then a testing apparatus may improperly match the monitored signal to the defined stencil even though the monitored signal was generated by a device not having the condition represented by the defined stencil.

What is needed, therefore, is a method and apparatus for automatically constructing stencils that are representative of signals having similar characteristics.

DISCLOSURE OF THE INVENTION

In accordance with one embodiment of the present invention, there is provided a method of automatically constructing a stencil that is representative of signals having similar characteristics. One step of the method includes obtaining from a frequency spectrum for a signal, characteristic frequency boundaries that define characteristic frequency intervals for the signal. Another step of the method includes generating the stencil representative of signals having similar characteristics by defining stencil components based upon the characteristic frequency intervals and the frequency spectrum.

Pursuant to another embodiment of the present invention, there is provided a stencil generator for automatically constructing a stencil that is representative of signals having similar characteristics. The stencil generator includes a component generator coupled to a boundary extractor. The boundary extractor is operable to receive a frequency spectrum of a signal. Moreover, the boundary extractor is operable to obtain from the received frequency spectrum characteristic frequency boundaries for the signal. The component generator is operable to receive the frequency spectrum, and receive the characteristic frequency boundaries from the boundary extractor. The component generator is also operable to define stencil components based upon the characteristic frequency boundaries and the frequency spectrum.

Pursuant to yet another embodiment of the present invention, there is provided a stencil generator for automatically constructing a stencil that is representative of signals having similar characteristics. The stencil generator includes a processor that is coupled to a memory device having stored therein instructions. The instructions when executed by the processor cause the processor to obtain from a frequency spectrum for a signal, characteristic frequency boundaries that define characteristic frequency intervals for the signal. The instructions when executed by the processor further cause the processor to generate the stencil representative of signals having similar characteristics by defining stencil components based upon the characteristic frequency intervals and the frequency spectrum.

It is an object of the present invention to provide a new method and apparatus for constructing a stencil that is representative of a class of signals.

It is an object of the present invention to provide an improved method and apparatus for constructing a stencil that is representative of a class of signals.

It is yet another object of the present invention to provide a method and apparatus that automate stencil construction in order to lower the cost associated with stencil construction.

It is still another object of the present invention to provide a method and apparatus that construct a stencil that results in a testing apparatus having a low rate of misclassification of a monitored signal.

The above and other objects, features, and advantages of the present invention will become apparent from the following description and the attached drawings.

BEST MODE FOR CARRYING OUT THE INVENTION

Figure 1:
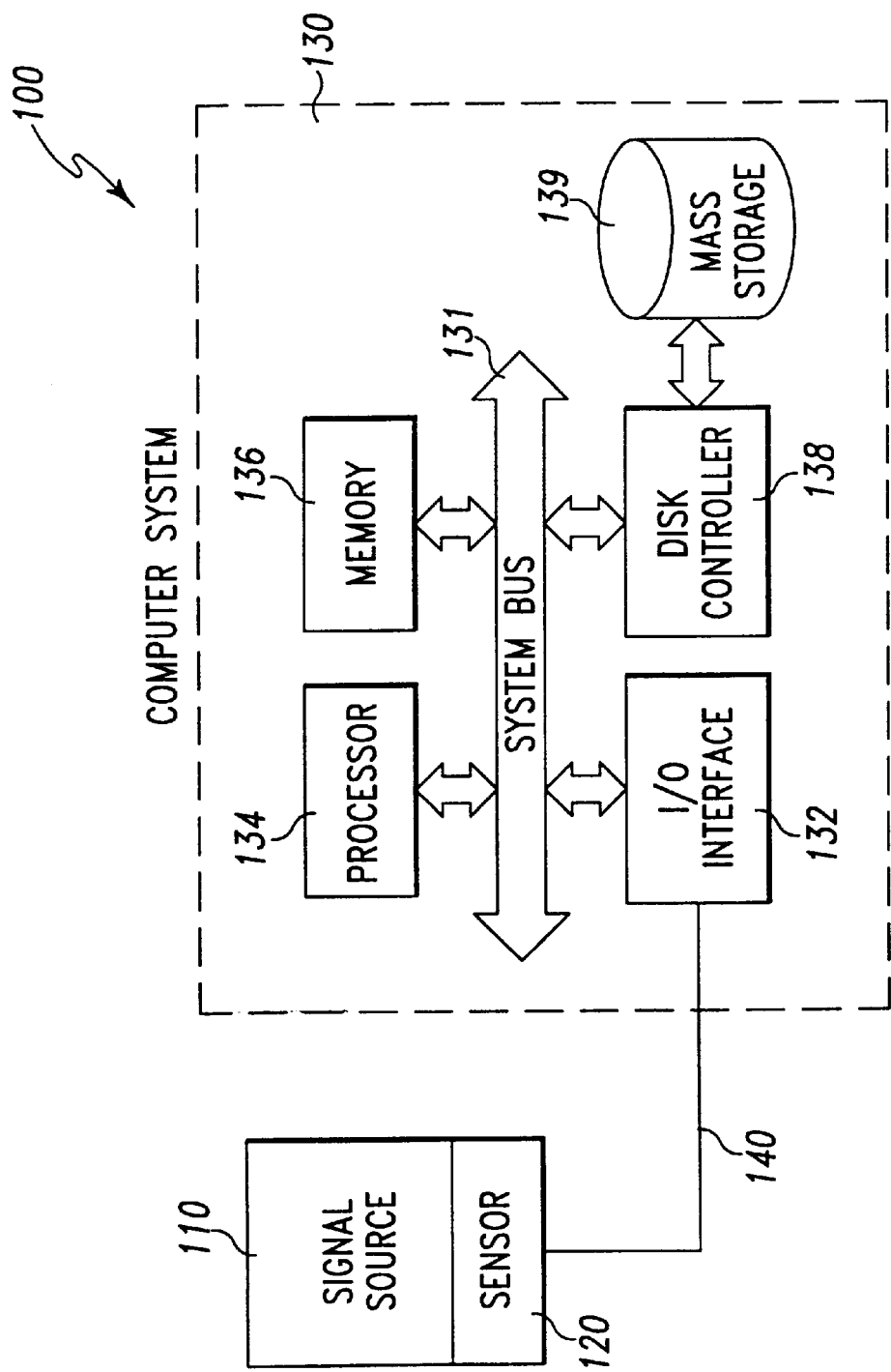
FIG. 1 shows a block diagram of a preferred embodiment of a stencil construction system which incorporates features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

FIG. 1 illustrates a stencil construction system 100 that incorporates features of the present invention therein. In general, the stencil construction system 100 monitors a signal source 110, constructs a stencil representative of the signal source 110, and stores the constructed stencil in a stencil library for future reference. To this end, the stencil construction system 100 includes a sensor 120 coupled to a computer system 130 via a sense wire 140. In particular the sensor 120 is positioned with respect to the signal source 110 such that the sensor 120 may generate a time-varying signature signal based upon stimuli generated by the signal source 110. For example, the sensor 120 may be a vibration detector placed in contact with a properly operating automotive transmission so that the sensor 120 may generate a signature signal indicative of the vibrations produced by a properly operating automotive transmission.

Figure 2A:
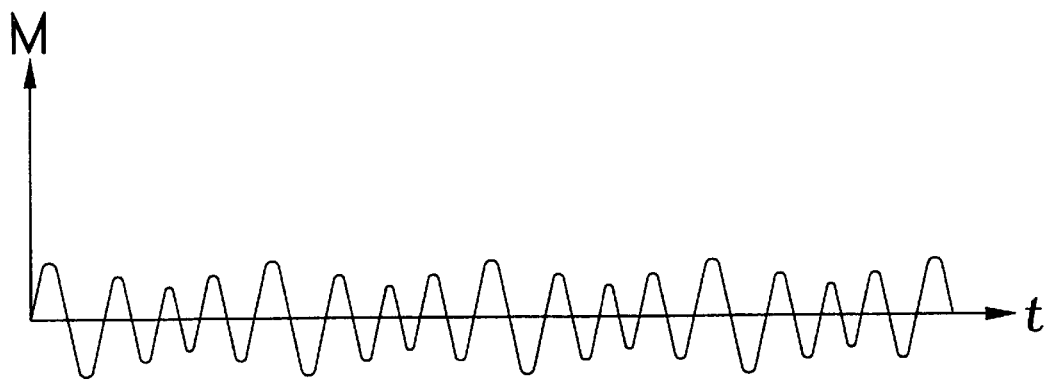
FIGS. 2A–2F graphically illustrates a signature signal and the processing steps performed by the stencil construction system of FIG. 1 in constructing a stencil for the signature signal.

Moreover, the sensor 120 may be implemented with various known types of sensors that are responsive to the various types of stimuli produced by the signal source 110. For example, the sensor 120 may be implemented with sensors capable of sensing infrared, ultraviolet, electrical, electromagnetic, acoustical, and/or other types of energy that may be generated by the signal source 110. An exemplary time-varying signature signal is illustrated in FIG. 2A. As illustrated, the time-varying signature signal varies in amplitude with respect to time.

The computer system 130 of the stencil construction system 100 is operable to process the signature signal of the sensor 120 in order to construct a stencil representative of the signature signal. To this end, the computer system 130 includes a system bus 131 which operably couples an I/O interface 132, a processor 134, a memory 136, and a disk controller 138 together. The I/O interface 132 is operable to receive and digitize the signature signal produced by the sensor 120. In particular, the I/O interface 132 is operable to sample the signature signal at a sampling rate greater than the Nyquist frequency for the signature signal in order to obtain a series of digital words that are representative of the signature signal. For example, the I/O interface 132 may sample the signature signal at a sampling rate of 100 kilohertz (KHz). As a result of sampling the signature signal at the sampling rate, the I/O interface 132 produces a series of digital words which represent the signature signal generated by the sensor 120.

The processor 134 is operable to execute the instructions stored in the memory 136 and to control the various components of the computer system 130. In particular, the processor 134 may be implemented with a Pentium II processor manufactured by Intel Corporation. However, it should be appreciated by those skilled in the art that the processor 134 may be implemented with processors and/or microcontrollers manufactured by other companies such as AMD, CYRIX, and Motorola.

Moreover, the memory 136 is operable to store instructions and data executed and manipulated by the processor 134. The memory 136 may include ROM (read only memory) and/or RAM (random access memory). In particular, the memory 136 is operable to store instructions which when executed by the processor 134 cause the processor 134 to analyze the signature signal produced by the sensor 120, construct a stencil that is representative of the signature signal, and store the stencil in a mass storage unit 139 such as a disk drive via the disk controller 138.

Figure 3A:
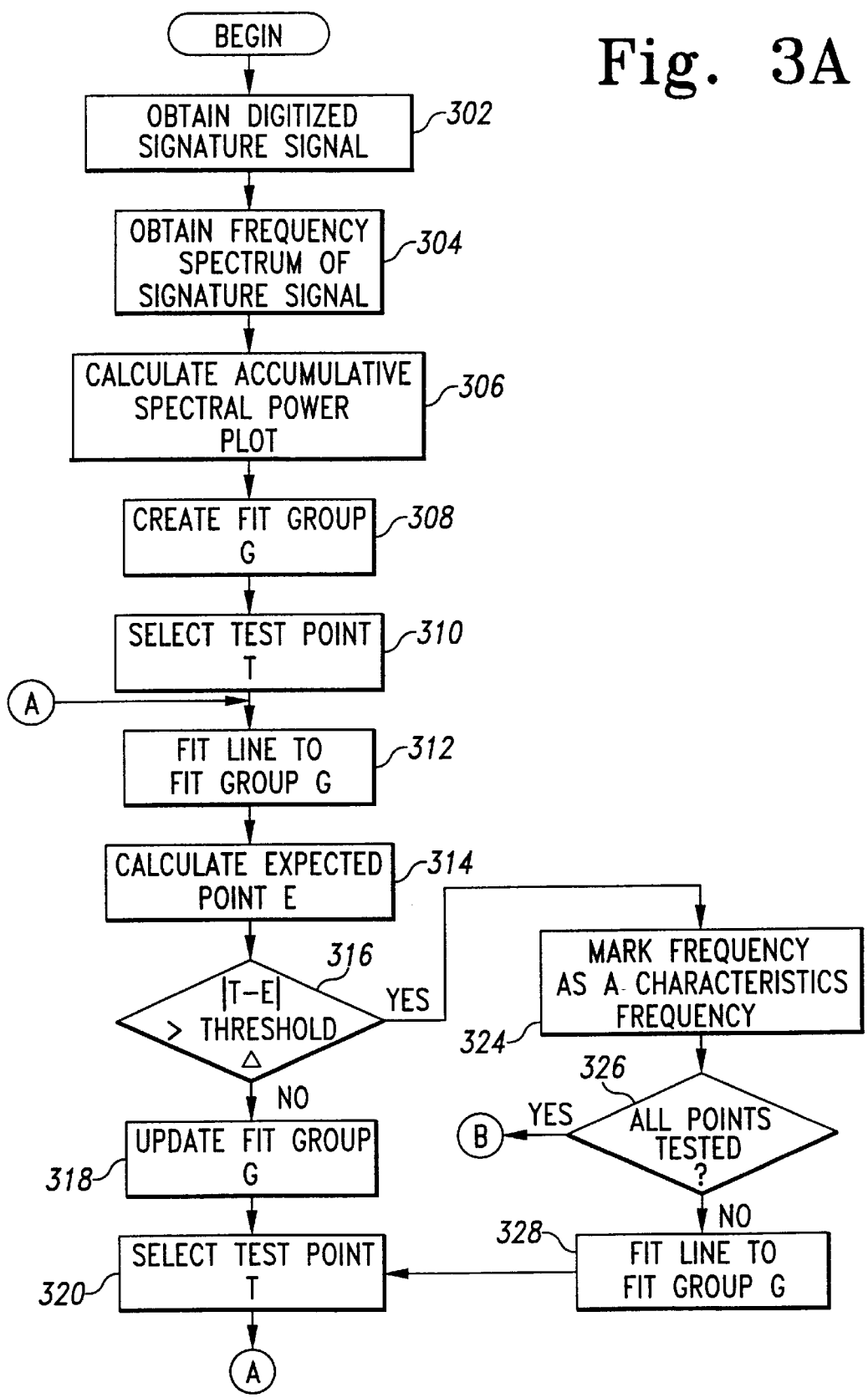
FIG. 3A illustrates a boundary extraction process used by the stencil construction system of FIG. 1 to extract characteristic boundary frequencies for a signature signal.
Figure 3B:
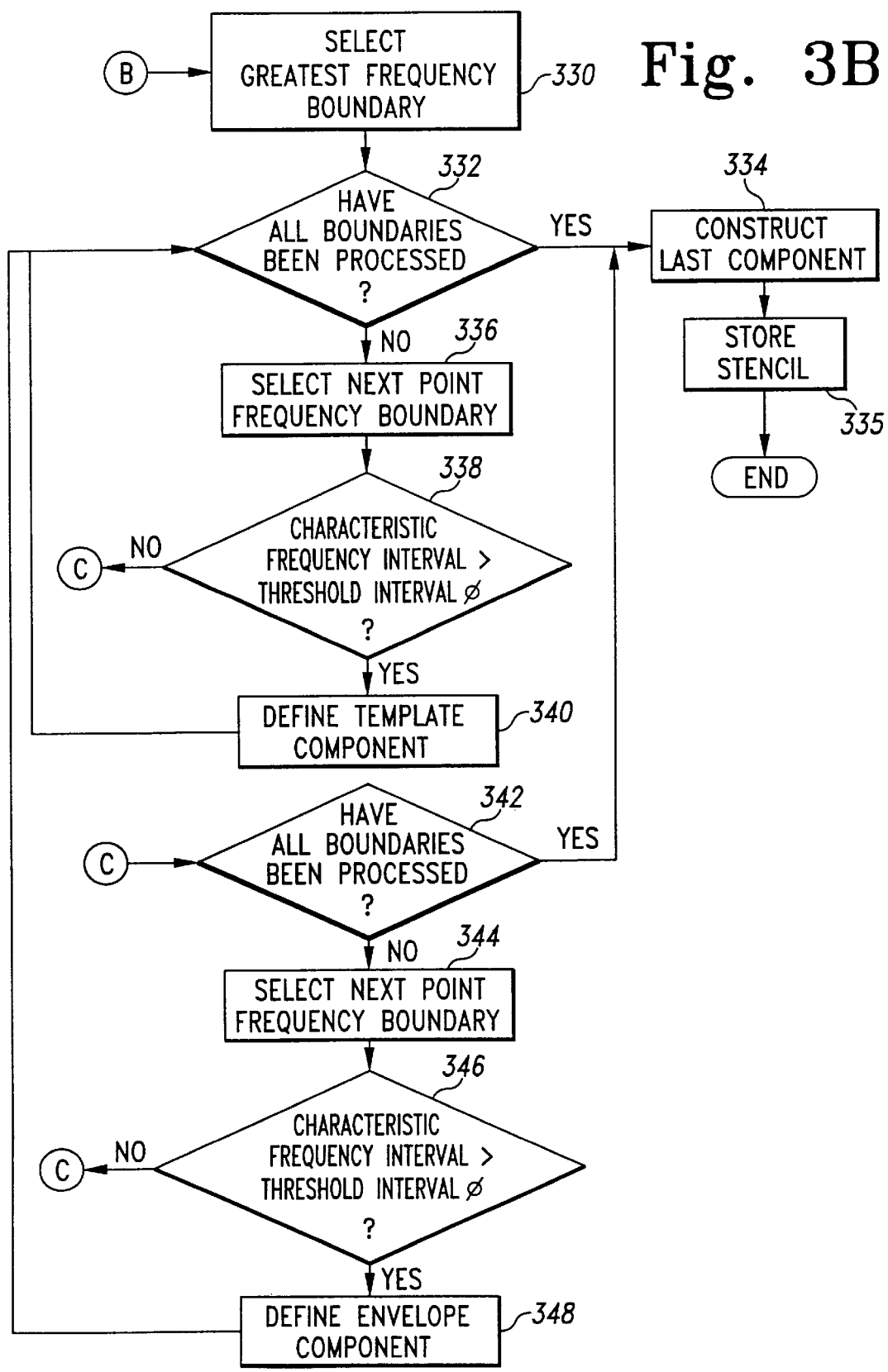
FIG. 3B illustrates a stencil component definition process used by the stencil construction system of FIG. 1 to define template components and stencil components based upon the extracted characteristic boundary frequencies.

FIGS. 3A and 3B illustrate a flowchart of a stencil generation routine that is stored in the memory 136. In general, the stencil generation routine constructs a stencil that is representative of the signature signal received from the sensor 120. More specifically, the stencil generation routine includes a boundary extraction subroutine (FIG. 3A) which when executed by the processor 134 causes the processor 134 to extract characteristic frequency boundaries for a signature signal, and a stencil component definition subroutine (FIG. 3B) which when executed by the processor 134 causes the processor to define stencil components based upon the extracted characteristic frequency boundaries.

The boundary extraction subroutine begins with the processor 134 in step 302 obtaining from the I/O interface 132 digital words representing a signature signal that has been digitized by the I/O interface 132. As stated previously, the I/O interface 132 digitizes a signature signal generated by sensor 120 in response to stimuli of a signal source (e.g. an automotive transmission). An exemplary signature signal is illustrated in FIG. 2A.

Figure 2B:
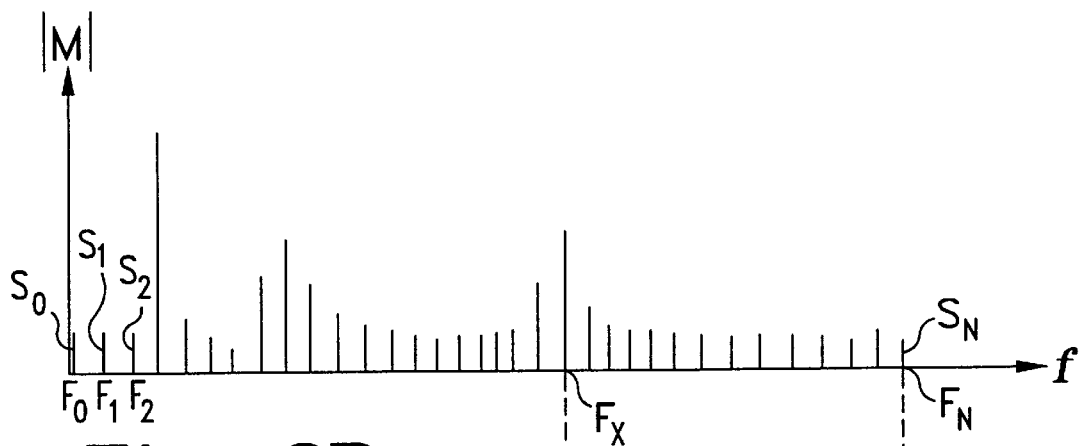

Then in step 304, the processor 134 transforms the digitized signature signal from the time domain to a frequency domain in order to obtain a frequency spectrum for the digitized signature signal. To this end, the processor 134 performs a frequency transform operation (e.g. a fast Fourier (FFT) transform operation) upon the digitized signature signal in order to generate a frequency spectrum indicative of the spectral components comprising the signature signal. An exemplary frequency spectrum is illustrated in FIG. 2B. As illustrated the frequency spectrum includes several spectral components $S_0 \ldots S_N$ each having a corresponding spectral frequency $F_0 \ldots F_N$ and a corresponding spectral magnitude $M_0 \ldots M_N$.

After obtaining the frequency spectrum from the digitized signature signal, the processor 134 in step 306 calculates an accumulative spectral power plot from the frequency spectrum. Each point $S_0 \ldots S_N$ of the accumulative spectral power plot represents a spectral frequency and the accumulative spectral power represented by the spectral components up to and including the corresponding spectral components $P_0 \ldots P_N$. In the preferred embodiment of the present invention, the processor 134 generates each point $P_0 \ldots P_N$ of the accumulative spectral power plot by summing together the spectral magnitudes $M_0 \ldots M_N$ corresponding to the first spectral component $S_0$ of the frequency spectrum through the spectral component S having the frequency component F. For example, as illustrated in the exemplary spectral power plot of FIG. 2C, the point $P_X$ represents a spectral frequency $F_X$ and an accumulative spectral power equal to the summation of the spectral magnitudes $M_0 \ldots M_X$.

Once the processor 134 has calculated the accumulative spectral power plot, the processor 134 obtains characteristic frequency boundaries from the accumulative spectral power plot by utilizing a line fitting technique. In general, the processor 134 fits lines to the accumulative spectral power plot starting from the last point $P_N$ of the accumulative spectral power plot and working toward the first point $P_0$ of the accumulative spectral power plot, and selects the spectral frequencies corresponding to points of the accumulative spectral power plot that deviate from the fitted lines by more than a threshold amount $\Delta$.

Figure 2C:
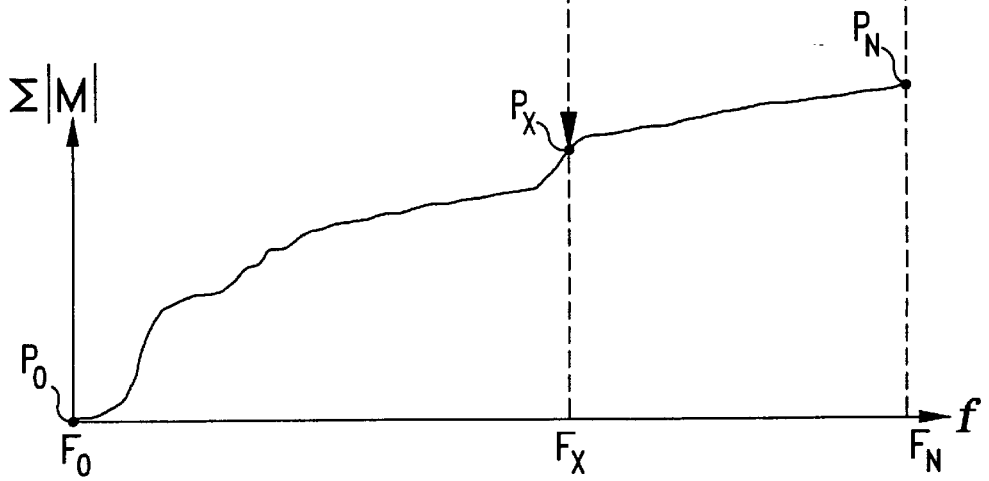
Figure 2D:
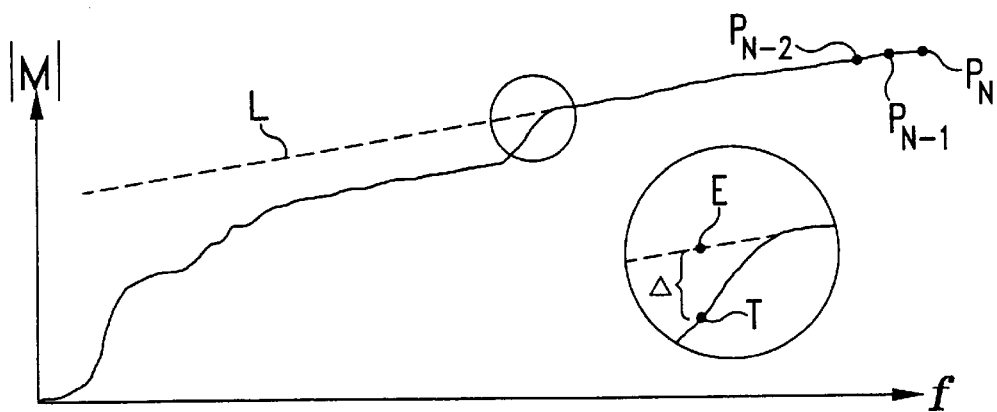

Referring to FIG. 3A and FIG. 2D, the processor 134 of the preferred embodiment obtains the characteristic frequency boundaries by first creating a fit group G in step 308. In particular, the processor 134 selects the last two points $P_N$ and $P_{N-1}$ of the accumulative spectral power plot 230 for inclusion into the fit group G. Then, the processor 134 in step 310 selects a test point T. In particular, the processor 134 selects the next point $P_{N-2}$ of the accumulative spectral power plot 230 for use as test point T.

In step 312, the processor 134 fits a line L to the points of the fit group G by using a linear regression technique. The processor 134 in step 314 calculates an expected point E corresponding to the same spectral frequency as the test point T. After fitting the line L to the points of the fit group G and calculating the expected point E, the processor 134 determines in step 316 whether the test point T deviates from the line L by more than a threshold amount $\Delta$. In particular, the processor 134 determines whether the difference between the test point T and the expected point E is greater than the threshold amount $\Delta$.

If the processor 134 determines in step 316 that the test point T does not differ from the expected point E by more than the threshold amount $\Delta$, then the processor 134 proceeds to step 318 in order to update the fit group G and select another test point T. The processor 134 in step 318 places the point of the accumulative spectral power plot corresponding to the test point T into the fit group G, and in step 320 selects the next point of the accumulative spectral power plot for the test point T. After updating the fit group G and selecting a new test point T, processor 134 returns to step 312 in order refit the line L to the points of the updated fit group G and test the new test point T.

However, if the processor 134 determines in step 316 that the test point T differs from the expected point E by more than the threshold amount $\Delta$, then the processor 134 proceeds to step 324. In step 324, the processor 134 marks the spectral frequency corresponding to the test point T as a characteristic frequency boundary. Then, the processor 134 in step 326 determines whether all points of the accumulative spectral power plot have been tested. In particular, the processor 134 in the preferred embodiment determines whether the spectral frequency corresponding to the test point T is equal to zero (i.e. whether the test point T corresponds to the DC component of the frequency spectrum).

Figure 2E:
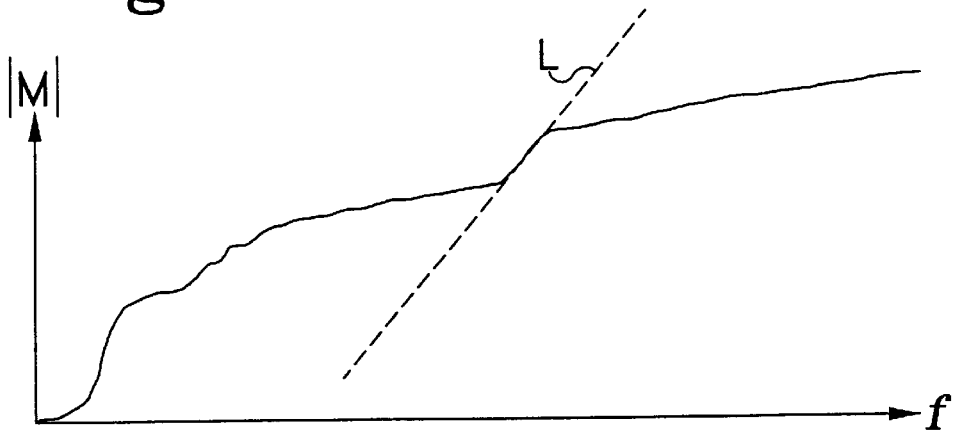

If the processor 134 determines that all points of the accumulative spectral power plot have not been tested, then the processor 134 proceeds to step 328 in order to redefine the fit group G. In particular, the processor 134 in step 324 removes all the points currently included in the fit group G, and then places the current test point T and the previous test point into the fit group G. After redefining the fit group G, the processor 134 proceeds to step 320 in order to select the next test point T and to refit the line L to the points of the redefined fit group G. As a result of redefining the fit group G in t he above manner, the refitted line L may have a substantially different slope than the previously fitted line. This substantial change in slope in the line L is illustrated in FIG. 2D and FIG. 2E.

If, however, the processor 134 determines in step 326 that all points of the accumulative spectral power plot have been tested, then the processor 134 proceeds to step 330 of the stencil component definition subroutine (FIG. 3B) in order to construct a stencil representative of signals similar to the signature signal. In general, the processor 134 constructs the stencil by defining rectangular stencil components (i.e. templates) and curved stencil components (i.e. envelopes) based upon the characteristic frequency boundaries obtained by the processor 134 executing the boundary extraction subroutine of FIG. 3A.

More specifically, the stencil component definition subroutine causes the processor 134 to define a template component for each characteristic frequency interval greater than a threshold frequency interval $\Phi$, and a curved stencil component for each combined frequency intervals that includes at least one characteristic frequency interval less than the threshold frequency interval $\Phi$.

To this end, the processor 134 in step 330 selects from the obtained characteristic frequency boundaries, the characteristic frequency boundary corresponding to the greatest spectral frequency. Then, in step 332 the processor 134 determines whether there are any obtained characteristic frequency boundaries which have yet to be processed. If the processor 134 determines that all of the characteristic frequency boundaries have been selected and processed, then the processor 134 proceeds to step 334 in order to generate the last component of the stencil.

If, however, the processor 134 determines in step 332 that not all of the obtained characteristic frequency boundaries have been selected and processed, then the processor 134 proceeds to step 336. In step 336, the processor 134 selects the next characteristic frequency boundary. After selecting the next characteristic frequency boundary, the processor 134 then determines whether the characteristic frequency interval defined by the selected characteristic frequency boundaries is greater than a threshold frequency interval $\Phi$ (step 338).

If the processor 134 determines that the characteristic frequency interval is greater than the threshold frequency interval $\Phi$, then the processor 134 proceeds to step 340 in order to define a template component for the characteristic frequency interval. In particular, the processor 134 in step 340 defines the template component by defining a maximum spectral magnitude $M_{MAX}$ for spectral components included in the characteristic frequency interval defined by the lower characteristic frequency boundary and the higher frequency characteristic boundary (see FIG. 2F).

Figure 2F:
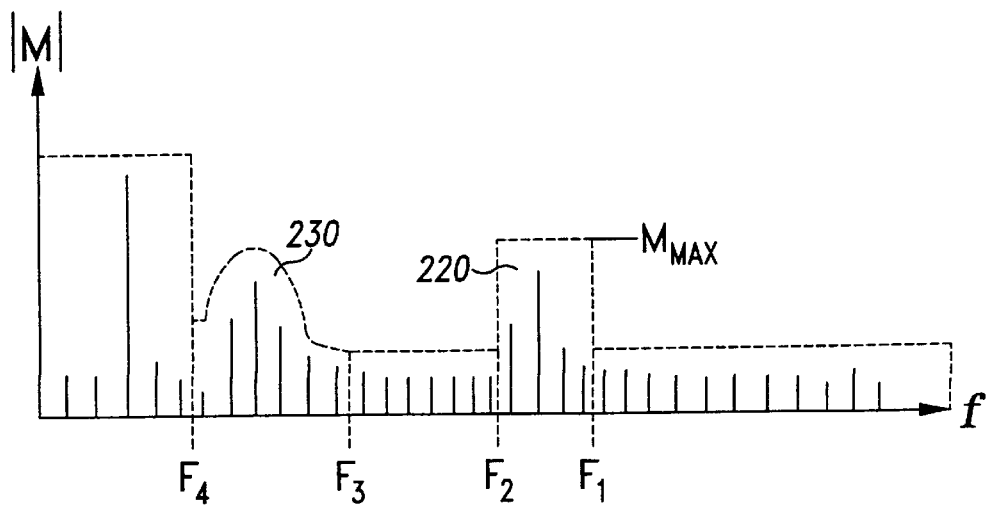

The processor 134 may determine the maximum spectral magnitude $M_{MAX}$ for the characteristic frequency interval using several techniques. For example, the processor 134 may simply define the maximum spectral magnitude $M_{MAX}$ as a percentage (e.g. 110%) of the greatest spectral magnitude occurring in the characteristic frequency interval. A characteristic frequency interval $F_1$ to $F_2$ and a template component 220 are illustrated in FIG. 2F.

Alternatively, the processor 134 may analyze the same characteristic frequency interval of several frequency spectra obtained from several devices having similar characteristics and statistically define the maximum spectral magnitude $M_{MAX}$. For example, the processor 134 may define the maximum spectral magnitude $M_{MAX}$ as $+3\sigma$ (i.e. +3 standard deviations) from the expected variability of spectral magnitudes included in the characteristic frequency boundary. After defining the template component for the characteristic frequency boundary, the processor 134 returns to step 332 in order to process the next characteristic frequency boundary.

However, if the processor 134 in step 338 determines that the characteristic frequency interval defined by the selected characteristic frequency boundaries is not greater than the threshold frequency interval $\Phi$, then the processor 134 proceeds to step 342 in order to created a combined frequency interval having at least one characteristic frequency interval that is not greater than the threshold frequency interval $\Phi$.

In step 342, the processor 134 determines whether there are any obtained characteristic frequency boundaries which have yet to be processed. If the processor 134 determines that all of the characteristic frequency boundaries have been selected and processed, then the processor 134 proceeds to step 334 in order to generate the last component of the stencil. In step 334, the processor 134 constructs a template component or an envelope component in a manner similar to steps 340 and 348 for any remaining frequency interval which has not been previously defined by steps 340 and 348. After defining the remaining components of the stencil, the processor 134 causes the newly defined stencil to be stored on the mass storage device 139 so that a stencil library may be maintained for future testing of signature signals (step 335).

If, however, the processor 134 determines in step 342 that not all of the obtained characteristic frequency boundaries have been selected and processed, then the processor 134 proceeds to step 344. In step 344, the processor 134 selects the next characteristic frequency boundary in order to create a combined frequency boundary spanning adjacent characteristic frequency intervals which have yet to have stencil components defined for them.

After selecting the next characteristic frequency boundary, the processor 134 determines whether the combined frequency interval defined by the selected characteristic frequency boundaries is greater than the threshold frequency interval $\Phi$ (step 346). If the processor 134 determines that the combined frequency interval is greater than the threshold frequency interval $\Phi$, then the processor 134 proceeds to step 348 in order to define an envelope component for the combined frequency interval. However, if the processor 134 determines that the combined frequency interval defined by the selected characteristic frequency boundaries is not greater than the threshold frequency interval $\Phi$, then the processor 134 returns to step 342 in order to increase frequency interval of the combined frequency interval.

After determining that the combined frequency interval is greater than the threshold frequency interval $\Phi$, the processor in step 348 defines an envelope component for the combined frequency interval. In particular, the processor 134 defines the envelope component by separately defining a maximum spectral magnitude $M_{MAX}$ for each spectral component of the frequency spectrum included in the combined frequency interval. In particular, the processor 134 may simply define the maximum spectral magnitude $M_{MAX}$ for each spectral component as a percentage (e.g. 110%) of the corresponding spectral magnitude $M_X$. A combined frequency interval $F_3$ to $F_4$ and a envelope component 230 are illustrated in FIG. 2F.

Alternatively, the processor 134 may analyze the same combined frequency interval of several frequency spectra obtained from several signal sources having similar characteristics and statistically define the maximum spectral magnitudes $M_{MAX}$ for each spectral component $S_X$. For example, the processor 134 may define the maximum spectral magnitude $M_{MAX}$ as $+3\sigma$ (i.e. +3 standard deviations) from the expected variability of each spectral magnitude $M_X$. After defining the envelope component for the combined frequency boundary, the processor 134 returns to step 332 in order to process the next characteristic frequency boundary.

Figure 4:
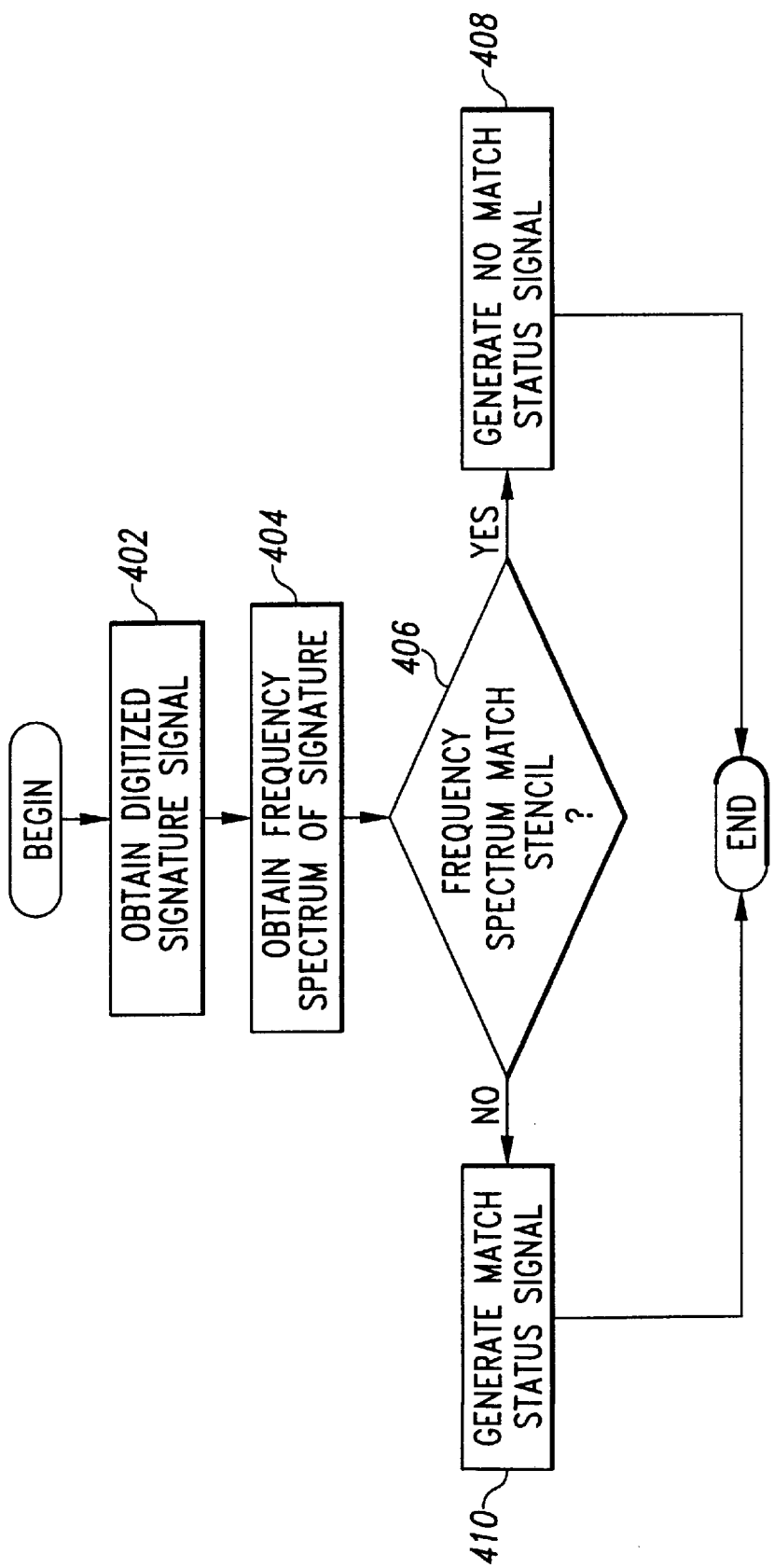
FIG. 4 illustrates a testing routine which may be used by the stencil construction system of FIG. 1 to determine whether a device has a characteristic represented by a defined stencil.

Besides constructing stencils, the stencil construction system 100 is further operable to utilize the defined stencils to test devices for certain characteristics. In particular, the memory 136 of the stencil construction system 100 may further include a testing routine 400 (FIG. 4) which when executed by the processor 134 causes the processor 134 to test a device for certain characteristics. In particular, the testing routine 400 causes the processor 134 in step 402 to obtain from the I/O interface 132 digital words representing a signature signal that has been digitized by the I/O interface 132. As stated previously, the I/O interface 132 digitizes a signature signal generated by the sensor 120 in response to stimuli of a signal source (e.g. an automotive transmission).

Then in step 404, the processor 134 transforms the digitized signature signal from the time domain to a frequency domain in order to obtain a frequency spectrum for the digitized signature signal. To this end, the processor 134 performs a frequency transform operation (e.g. FFT operation) upon the digitized signature signal in order to generate a frequency spectrum indicative of the spectral components comprising the signature signal.

After obtaining the frequency spectrum from the digitized signature signal, the processor 134 in step 406 is operable to monitor characteristics of the signal source. In particular, the processor 134 may select a previously defined stencil from the stencil library stored on mass storage device 139, and compare the frequency spectrum of the digitized signature signal to the selected stencil in order to determine whether the signal source has the same characteristics as the signal source represented by the defined stencil. For example, the processor 134 may compare the frequency spectrum to a stencil defined for a properly working transmission.

In monitoring the signal source the processor 134 determines for each rectangular template component of the selected stencil whether a spectral component in the characteristic frequency interval defined by the template component has a spectral magnitude greater than a maximum spectral magnitude defined for the template component. Likewise, the processor 134 determines for each curved envelope component of the selected stencil whether each spectral component in the combined frequency interval defined by the envelope component is less than the maximum spectral magnitude defined for the spectral component.

If a spectral component of the frequency spectrum exceeds its respective maximum spectral magnitudes, then the processor 134 may generate in step 408 a status signal indicating that the signal source does not have the characteristic represented by the stencil. For example, the processor 134 may generate in step 408 a status signal indicative of an automotive transmission that is not properly operating.

If, however, none of the spectral components of the frequency spectrum exceeds its respective maximum spectral magnitudes, then the processor 134 may generate in step 410 a status signal indicating that the signal source does have the characteristic represented by the stencil. For example, the processor 134 may generate in step 410 a status signal indicative of a properly operating automotive transmission.

It should be appreciated from the above description that template component comparisons are less computational than envelope component comparisons. This is because for template component comparisons the processor 134 need only compare the largest spectral magnitude within a characteristic frequency interval to the maximum spectral magnitude defined for the template component, whereas for envelope component comparisons, the processor 134 needs to compare each spectral magnitude within the combined frequency interval to the maximum spectral magnitude for each spectral magnitude.

Templates components and envelope components have other advantages and disadvantages. For example, an envelope component that defines a group of narrow frequency intervals is less susceptible to a slight frequency shift than several narrow template components defining the same narrow frequency intervals. Also, envelope components more accurately represent frequency spectra of signature signals than template components due to the greater resolution (i.e. more spectral magnitude definitions). However, this greater resolution also causes the processor 134 to make more comparisons in processing envelope components than template components, and requires more storage space in the mass storage device 139. The stencil construction system 100 in light of these properties of envelope and template components attempts to construct stencils which are easy to process yet produce accurate status monitoring results.

Figure 5:
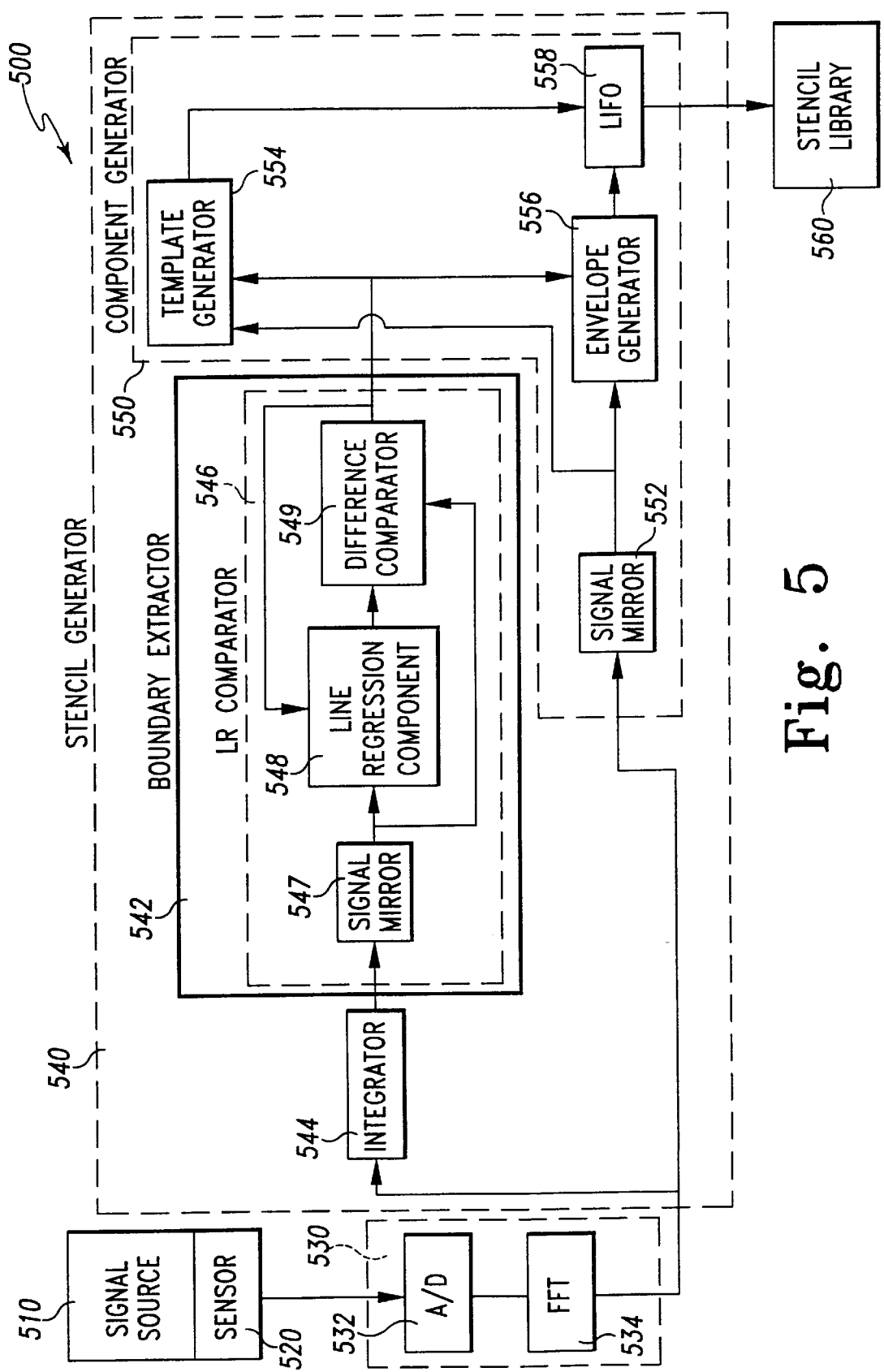
FIG. 5 illustrates an alternative embodiment of the stencil construction system of FIG. 1.

An alternative embodiment of a stencil construction system 500 is illustrated in FIG. 5. The stencil construction system 500 includes a sensor 520, a spectral analyzer 530, a stencil generator 540, and a stencil library 560. The sensor 520 operates in the same manner as the sensor 120 of FIG. 1. Moreover the stencil library performs the same function as the mass storage device 139 of FIG. 1. Accordingly, the sensor 520 and the stencil library 560 will not be discussed in further detail.

The spectral analyzer 530 of the stencil construction system 500 is coupled to the sensor 520 in order to receive a signature signal produced by the sensor 520. In particular, the sensor 520 produces the signature signal in response to stimuli generated by a signal source 510 such as an automotive component. Moreover, the spectral analyzer 530 is operable to digitize the received signature signal, and transform the digitized signature signal from the time domain to the frequency domain. To this end, the spectral analyzer 530 includes an analog-to-digital (A/D) converter 532 that is coupled to the sensor 520, and a frequency transform processor 534 such as a FFT processor that is coupled to the A/D converter 532. In particular, the A/D converter 532 samples the signature signal at a sampling rate greater than the Nyquist rate for the signature signal in order to produce a series of digital words which represent the magnitude of the signature signal at different points in time. For example, the A/D converter 532 may sample the signature signal at 100 kilohertz (KHz) in order to produce a digitized signature signal comprising 100 samples per a millisecond (msec) The frequency transform processor 534 is operable to received the digitized signature signal from the A/D converter 532, and generate a frequency spectrum from the digitized signature signal. Specifically, the frequency transform processor 534 performs a frequency transform such as a FFT transform upon the samples generated by the A/D converter 532 in order to produce a frequency spectrum having spectral components which are representative of the frequency content of the signature signal produced by the sensor 520. In particular, the frequency transform processor 534 outputs the frequency spectrum starting with the DC component of the signature signal followed by increasingly higher spectral frequency components. An exemplary frequency spectrum is illustrated in FIG. 2B.

The stencil construction system 100 also includes the stencil generator 540 which is operable to construct a stencil for the signature signal. In particular, the stencil generator 540 is coupled to the spectral analyzer 530 in order to receive the frequency spectrum produced by the spectral analyzer 530. Moreover, the stencil generator 540 is operable to construct a stencil from the received frequency spectrum which may be later used to determine whether a device has a particular characteristic (e.g. proper operation, or defective operation due to a specific component).

The stencil generator 540 includes a boundary extractor 542 and a component generator 550. In general, the boundary extractor 542 is operable to extract characteristic frequency boundaries from the received frequency spectrum, and the component generator 550 is operable to define stencil components based upon the extracted characteristic frequency boundaries. In order to extract characteristic frequency boundaries from the received frequency spectrum, the boundary extractor 542 includes an integrator 544 and a linear regression comparator 546. The integrator 544 is coupled to the spectrum analyzer 530 in order to receive the frequency spectrum of the signature signal. Moreover, the integrator 544 is operable to sum the spectral magnitudes of the frequency spectrum together in order to generate an accumulative spectral power signal which starts from the spectral power of the DC component of the frequency spectrum and proceeds to the total spectral power of the frequency spectrum.

The linear regression comparator 546 is coupled to the integrator 544 in order to receive the accumulative spectral power signal. In general, the linear regression comparator 546 generates an include signal each time the linear regression comparator 546 determines that a certain frequency of the frequency spectrum is a characteristic frequency boundary of the frequency spectrum. In this manner, the linear regression comparator 546 is operable to extract the characteristic frequency boundaries for the signature signal.

In particular, as depicted in FIG. 2C, the linear regression comparator 546 fits lines to the accumulative spectral power signal starting from the total spectral power of the frequency spectrum and working toward the spectral power of the DC component of the frequency spectrum. To this end, the linear regression comparator 546 includes a signal mirror 547, a linear regression component 548, and a difference comparator 549. The signal mirror 547 is coupled to the integrator 544 in order to obtain the accumulative spectral power signal. Moreover, the signal mirror 547 is operable to mirror the accumulative spectral power signal in order to produce a mirrored accumulative spectral power signal which starts with the total spectral power of the signature signal and proceeds to the spectral power of the DC component of the frequency spectrum.

The linear regression component 548 is coupled to the signal mirror 547 in order to receive the mirrored accumulative spectral power signal. As illustrated in FIG. 2D, the linear regression component 548 generates an expected level E for the mirrored accumulative spectral power signal by fitting lines to the mirrored accumulative spectral power signal starting with the total spectral power of the signature signal and proceeding toward the spectral power of the DC component of the frequency spectrum. In particular, the linear regression component 548 continually updates the expected level E based upon a portion of the mirrored accumulative spectral power signal since the last extracted characteristic frequency boundary. In other words, as depicted in FIG. 2E, the linear regression component 548 resets its line fitting each time the linear regression component 548 receives an include signal from the difference comparator 549.

The difference comparator 549 is coupled to the linear regression component 548 in order to receive the expected level E, and to the signal mirror 549 in order to receive the mirrored accumulative spectral power signal. The difference comparator 549 is operable to determine whether a frequency is a characteristic frequency boundary of the signature signal. The difference comparator 549 makes this determination by comparing the expected level E to the mirrored accumulative spectral power signal. If the expected level E differs from the mirrored accumulative spectral power signal by more than a threshold amount Δ, then the difference comparator 549 generates an include signal. The include signal indicates that the frequency corresponding to the current level of the mirrored accumulative spectral power signal is a characteristic frequency boundary of the signature signal.

The component generator 550 is coupled to the boundary extractor 540 in order to receive the include signal and is coupled to spectral analyzer 530 in order to receive the frequency spectrum of the signature signal. In general, the component generator 550 defines a stencil with envelope components and template components that are constructed based upon the characteristic frequency boundaries indicated by the include signal of the boundary extractor 540. Moreover, the component generator 550 further defines the stencil components based upon the spectral magnitudes obtained from the frequency spectrum generated by the spectral analyzer 530.

In order to define a stencil for the signature signal, the component generator 550 includes a signal mirror 552, a template generator 554, an envelope generator 556, and a last in first out (LIFO) queue 558. The signal mirror 552 is coupled to the spectral analyzer 530 in order to receive the frequency spectrum for the signature signal. The signal mirror 552 is operable to mirror the frequency spectrum to produce a mirrored frequency spectrum which starts from the spectral component having the greatest spectral frequency and proceeds toward the DC spectral component.

The template generator 554 is coupled to the signal mirror 552 in order to receive the mirrored frequency spectrum. Moreover, the template generator 554 is coupled to the boundary extractor 540 in order to receive the include signal from the difference comparator 549. In general, template generator 554 defines a template for characteristic frequency intervals that are greater than a threshold frequency interval Φ. Specifically, the template generator 554 is operable to obtain a first characteristic frequency boundary from the mirrored frequency spectrum in response to the boundary extractor 540 generating a first include signal. Similarly, the template generator 554 is operable to obtain a second characteristic frequency boundary from the mirrored frequency spectrum in response to the boundary extractor 540 generating a second include signal. Moreover, the template generator 554 is operable to track the spectral magnitudes of the mirrored frequency spectrum between the generation of the first include signal and the second include signal in order to obtain the largest spectral magnitude of the mirrored frequency spectrum.

If the characteristic frequency interval between the first and second frequency boundaries is greater than the threshold frequency interval Φ, then the template generator 554 is operable to store a template component definition in the LIFO queue 558. In particular, the template generator 554 defines the template component by storing a maximum spectral magnitude for the template component and the second spectral frequency boundary in the LIFO queue 558. The template generator 554 may calculate the maximum spectral magnitude by taking a percentage of the obtained largest spectral magnitude, or may statistically determine the maximum spectral magnitude based upon obtained largest spectral magnitudes from several frequency spectra. After defining the template component, the template generator 554 continues to process the mirrored frequency spectrum in a similar manner in order to define further template components.

The envelope generator 556 is coupled to the signal mirror 552 in order to receive the mirrored frequency spectrum. Moreover, the envelope generator 556 is coupled to the boundary extractor 540 in order to receive the include signal from the difference comparator 549. In general, the envelope generator 556 defines an envelope for combined frequency intervals that include at least one characteristic frequency interval that is not greater than a threshold frequency interval Φ. Specifically, the envelope generator 554 is operable to obtain a first characteristic frequency boundary from the mirrored frequency spectrum in response to the boundary extractor 540 generating a first include signal. Similarly, the envelope generator 556 is operable to obtain a second characteristic frequency boundary from the mirrored frequency spectrum in response to the boundary extractor 540 generating a second include signal.

Moreover, the envelope generator 556 is operable to track the spectral magnitudes of the mirrored frequency spectrum between the generation of the first include signal and the second include signal. If the characteristic frequency interval between the first and second frequency boundaries is not greater than the threshold frequency interval Φ, then the envelope generator 556 is operable to store an envelope definition in the LIFO queue 558.

In particular, the envelope generator 556 defines the envelope by storing in the LIFO queue 558 a maximum spectral magnitude for each spectral frequency of the frequency spectrum of a combined frequency interval which includes the characteristic frequency interval defined by the first characteristic frequency boundary and the second characteristic frequency boundary. To this end, the envelope generator 556 is further operable to track the spectral magnitudes of the mirrored frequency spectrum until the boundary extractor 540 generates an include signal that defines a combined frequency interval greater than the threshold frequency interval Φ. Specifically, the envelope generator 556 tracks the spectral magnitudes until the boundary extractor 540 indicates a third characteristic frequency boundary more than a threshold amount from the first characteristic frequency.

Similar to the template generator 554, the envelope generator 556 may calculate the maximum spectral magnitude for each spectral component by taking a percentage of the spectral magnitude of each spectral component, or may statistically determine the maximum spectral magnitude for each spectral component based upon spectral magnitudes from several frequency spectra. After defining the envelope, the envelope generator 554 continues to process the mirrored frequency spectrum in a similar manner in order to define further envelopes.

While the invention has been illustrated and described in detail in the drawings and foregoing description, such illustration and description is to be considered as exemplary and not restrictive in character, it being understood that only preferred embodiments have been shown and described and that all changes and modifications that come within the spirit of the invention are desired to be protected.

What is claimed is:

1. A method of automatically constructing a stencil representative of signals having similar characteristics, comprising the steps of:

obtaining from a frequency spectrum for a signal, a plurality of characteristic frequency boundaries that define a plurality of characteristic frequency intervals for said signal; and generating said stencil representative of signals having similar characteristics by defining a plurality of stencil components based upon said plurality of characteristic frequency intervals and said frequency spectrum.

2. The method of claim 1, wherein said generating step comprises the step of:

defining a rectangular stencil component for each characteristic frequency interval of said plurality of characteristic frequency intervals.

3. The method of claim 1, wherein said generating step comprises the step of:

defining a curved stencil component for each characteristic frequency interval of said plurality of characteristic frequency intervals.

4. The method of claim 1, wherein said generating step comprises the steps of:

combining characteristic frequency intervals of said plurality of characteristic frequency intervals with adjacent characteristic frequency intervals of said plurality of characteristic frequency intervals to form a group of combined frequency intervals in which each combined frequency interval represents a frequency interval greater than a threshold frequency interval;

defining a rectangular stencil component for each characteristic frequency interval of said plurality of characteristic frequency intervals that is not included in said group of combined frequency intervals; and defining a curved stencil component for each combined frequency interval of said plurality of characteristic frequency interval.

5. The method of claim 1, wherein said generating step comprises the steps of:

defining a rectangular stencil component for each characteristic frequency interval of said plurality of characteristic frequency intervals; and replacing a group of adjacent rectangular stencil components with a curved stencil component if a first rectangular stencil component of said group of adjacent rectangular stencil components represents a characteristic frequency interval of said plurality of characteristic frequency intervals that is less than a threshold frequency interval.

6. The method of claim 1, wherein said obtaining step comprises the steps of:

calculating an accumulative spectral power plot of said frequency spectrum;

fitting a first line to said accumulative spectral power plot; and selecting for a first characteristic frequency boundary of said plurality of characteristic frequency boundaries, a first frequency that corresponds to a first point of said accumulative spectral power plot which deviates from said first line by more than a threshold amount.

7. The method of claim 1, wherein said obtaining step comprises the steps of:

selecting said characteristic frequency boundaries based upon variations in an accumulative spectral power plot of said frequency spectrum.

8. A stencil generator for automatically constructing a stencil representative of signals having similar characteristics, comprising:

a boundary extractor that is operable to (i) receive a frequency spectrum of a signal, and (ii) obtain from said received frequency spectrum a plurality of characteristic frequency boundaries for said signal that define a plurality of characteristic frequency intervals; and a component generator coupled to said boundary extractor, said component generator operable to (i) receive said frequency spectrum, (ii) receive said plurality of characteristic frequency boundaries from said boundary extractor, and (iii) define a plurality of stencil components based upon said frequency spectrum and said plurality of characteristic frequency intervals defined by said plurality of characteristic frequency intervals.

9. The stencil generator of claim 8, wherein:

said component generator comprises a template generator that is operable to generate a maximum spectral magnitude for each characteristic frequency interval of said plurality of characteristic frequency intervals.

10. The stencil generator of claim 8, wherein:

said component generator comprises an envelope generator that is operable to generate a separate maximum spectral magnitude for each spectral component included in a combined frequency interval comprising at least two characteristic frequency intervals of said plurality of characteristic frequency intervals.

11. The stencil generator of claim 8, wherein said component generator comprises:

an envelope generator that is operable to generate a separate maximum spectral magnitude for each spectral component included in a combined frequency interval comprising (i) a second characteristic frequency interval of said plurality of characteristic frequency intervals that is less than a threshold frequency interval, and (ii) a third characteristic frequency interval of said plurality of characteristic frequency intervals that is adjacent to said second characteristic interval.

12. The stencil generator of claim 8, wherein said boundary extractor comprises:

an integrator that is operable to (i) receive said frequency spectrum, and (ii) generate an accumulative sum signal that is representative of the accumulative spectral power of said frequency spectrum; and a linear regression component that is operable to (i) receive said accumulative sum signal, (ii) fit a first line to said accumulative sum signal, and (iii) cause a first frequency to be included in said plurality of characteristic boundary frequencies in response to a first accumulative spectral power value of said accumulative sum signal deviating from said first line by more than a threshold amount.

13. The stencil generator of claim 8, wherein said boundary extractor comprises:

an accumulative summing component that is operable to (i) receive said frequency spectrum, and (ii) generate an accumulative sum signal that is representative of a magnitude sum of said frequency spectrum over frequency; and a linear regression comparator that is operable to (i) receive said accumulative sum signal, (ii) fit a first line to said accumulative sum signal from (a) magnitude sums corresponding to higher frequencies of said accumulative sum signal to (b) magnitude sums corresponding to lower frequencies of said accumulative sum signal, and (iii) cause a first frequency to be included in said plurality of characteristic boundary frequencies in response to a first magnitude sum of said accumulative sum signal deviating from said first line by more than a threshold amount.

14. A stencil generator for automatically constructing a stencil representative of signals having similar characteristics, comprising a processor coupled to a memory device having stored therein a plurality of instructions which when executed by said processor cause said processor to:

obtain from a frequency spectrum for a signal, a plurality of characteristic frequency boundaries that define a plurality of characteristic frequency intervals for said signal; and generate said stencil representative of signals having similar characteristics by defining a plurality of stencil components based upon said plurality of characteristic frequency intervals and said frequency spectrum.

15. The stencil generator of claim 14, wherein said plurality of instructions when executed by said processor further causes said processor to:

define a rectangular stencil component for each characteristic frequency interval of said plurality of characteristic frequency intervals.

16. The stencil generator of claim 14, wherein said plurality of instructions when executed by said processor further causes said processor to:

define a curved stencil component for each characteristic frequency interval of said plurality of characteristic frequency intervals.

17. The stencil generator of claim 14, wherein said plurality of instructions when executed by said processor further causes said processor to:

combine characteristic frequency intervals of said plurality of characteristic frequency intervals with adjacent characteristic frequency intervals of said plurality of characteristic frequency intervals to form a group of combined frequency intervals in which each combined frequency interval represents a frequency interval greater than a threshold frequency interval;

define a rectangular stencil component for each characteristic frequency interval of said plurality of characteristic frequency intervals that is not included in said group of combined frequency intervals; and define a curved stencil component for each combined frequency interval of said plurality of characteristic frequency interval.

18. The stencil generator of claim 14, wherein said plurality of instructions when executed by said processor further causes said processor to:

define a rectangular stencil component for each characteristic frequency interval of said plurality of characteristic frequency intervals; and replace a group of adjacent rectangular stencil components with a curved stencil component if a first rectangular stencil component of said group of adjacent rectangular stencil components represents a characteristic frequency interval of said plurality of characteristic frequency intervals that is less than a threshold frequency interval.

19. The stencil generator of claim 14, wherein said plurality of instructions when executed by said processor further causes said processor to:

calculate an accumulative spectral power plot of said frequency spectrum;

fit a first line to said accumulative spectral power plot; and select for a first characteristic frequency boundary of said plurality of characteristic frequency boundaries, a first frequency that corresponds to a first point of said accumulative spectral power plot which deviates from said first line by more than a threshold amount.

20. The stencil generator of claim 14, wherein said plurality of instructions when executed by said processor further causes said processor to:

calculate an accumulative spectral power plot of said frequency spectrum;

fit a first line to said accumulative spectral power plot from said higher frequencies of said accumulative spectral power plot toward said lower frequencies of said accumulative spectral power plot; and select for a first characteristic frequency boundary of said plurality of characteristic frequency boundaries, a first frequency corresponding to a first point of said accumulative spectral power plot which deviates from said first line by more than a threshold amount.

* * * * *